(12) United States Patent
Skolicki

(10) Patent No.: US 12,307,936 B2
(45) Date of Patent: May 20, 2025

(54) METHODS, SYSTEMS, AND MEDIA FOR DETECTING A PRESENTATION OF MEDIA CONTENT ON A DISPLAY DEVICE

(71) Applicant: Google LLC, Mountain View, CA (US)

(72) Inventor: Zbigniew Skolicki, Cracow (PL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/241,300

(22) Filed: Sep. 1, 2023

(65) Prior Publication Data
US 2023/0410709 A1    Dec. 21, 2023

Related U.S. Application Data

(63) Continuation of application No. 16/895,349, filed on Jun. 8, 2020, now Pat. No. 11,763,720, which is a
(Continued)

(51) Int. Cl.
*H04H 60/56* (2008.01)
*G06F 3/00* (2006.01)
(Continued)

(52) U.S. Cl.
CPC ........... *G09G 3/2003* (2013.01); *G06F 3/005* (2013.01); *G06F 16/70* (2019.01); *G06F 16/785* (2019.01);
(Continued)

(58) Field of Classification Search
CPC ........ G09G 3/2003; G09G 2320/0613; G09G 2320/08; G09G 2360/14; G06F 3/005;
(Continued)

(56) References Cited

U.S. PATENT DOCUMENTS

| 4,697,209 A * | 9/1987 | Kiewit .................. H04H 60/59 725/19 |
| 5,572,246 A | 11/1996 | Ellis et al. |

(Continued)

FOREIGN PATENT DOCUMENTS

| CN | 1180276 A | 4/1998 |
| CN | 1860767 A | 11/2006 |

(Continued)

OTHER PUBLICATIONS

International Search Report and Written Opinion dated from PCT Apn No. PCT/US2015/036734, mailed Sep. 25, 2015.
(Continued)

*Primary Examiner* — Jefferey F Harold
*Assistant Examiner* — Sahar Aqil Riaz
(74) *Attorney, Agent, or Firm* — Brake Hughes Bellermann LLP

(57) ABSTRACT

Methods, systems, and media for detecting a presentation of media content on a display device are provided. In accordance with some implementations, methods for detecting a presentation of media content on a display device are provided, the methods comprising: detecting, using a light sensor, light levels in the light sensor's surroundings; generating a signal representing the light levels; detecting, using a hardware processor, at least one variation in light levels indicative of a presentation of a video scene based on the signal; detecting at least one variation in light levels indicative of a scene change subsequent to the video scene based on the signal; and determining that media content is being presented on a display device in response to detecting the variation in light levels indicative of the presentation of the video scene and the variation in light levels indicative of the scene change.

20 Claims, 4 Drawing Sheets

Related U.S. Application Data continuation of application No. 15/912,084, filed on Mar. 5, 2018, now Pat. No. 10,679,542, which is a continuation of application No. 15/430,082, filed on Feb. 10, 2017, now Pat. No. 9,912,989, which is a continuation of application No. 14/930,290, filed on Nov. 2, 2015, now Pat. No. 9,569,995, which is a continuation of application No. 14/310,655, filed on Jun. 20, 2014, now Pat. No. 9,179,184.

(51) Int. Cl.
| | |
|---|---|
| G06F 16/70 | (2019.01) |
| G06F 16/783 | (2019.01) |
| G06V 20/40 | (2022.01) |
| G09G 3/20 | (2006.01) |
| H04H 60/37 | (2008.01) |
| H04H 60/59 | (2008.01) |
| H04N 5/14 | (2006.01) |
| H04N 21/422 | (2011.01) |
| H04N 21/435 | (2011.01) |
| H04N 21/442 | (2011.01) |
| H04N 21/4722 | (2011.01) |

(52) U.S. Cl.
CPC ............ *G06V 20/40* (2022.01); *H04H 60/377* (2013.01); *H04H 60/59* (2013.01); *H04N 5/147* (2013.01); *H04N 21/42202* (2013.01); *H04N 21/435* (2013.01); *H04N 21/442* (2013.01); *H04N 21/4722* (2013.01); *G09G 2320/0613* (2013.01); *G09G 2320/08* (2013.01); *G09G 2360/14* (2013.01)

(58) Field of Classification Search
CPC ....... G06F 16/70; G06F 16/785; G06V 20/40; H04H 60/377; H04H 60/59; H04N 5/147; H04N 21/42202; H04N 21/435; H04N 21/442; H04N 21/4722; H04N 21/44008
USPC .......................................................... 725/12
See application file for complete search history.

(56) References Cited

U.S. PATENT DOCUMENTS

| | | | |
|---|---|---|---|
| 8,051,454 B2 | 11/2011 | Krikorian et al. | |
| 8,498,487 B2 | 7/2013 | Singh et al. | |
| 8,713,590 B2 | 4/2014 | Cave | |
| 9,911,105 B1 | 3/2018 | Brown | |
| 10,585,954 B2 | 3/2020 | Brown et al. | |
| 2006/0078305 A1* | 4/2006 | Arora | G11B 27/28 348/E7.024 |
| 2006/0195860 A1 | 8/2006 | Eldering et al. | |
| 2006/0212895 A1* | 9/2006 | Johnson | H04H 60/32 725/12 |
| 2007/0025683 A1 | 2/2007 | Nobori | |
| 2008/0034295 A1 | 2/2008 | Kulas | |
| 2010/0328535 A1* | 12/2010 | Okui | G09G 3/20 348/E9.055 |
| 2012/0008045 A1* | 1/2012 | Yao | H04N 21/44222 348/E9.034 |
| 2012/0093476 A1* | 4/2012 | Mountain | H04N 21/44008 386/E5.028 |
| 2013/0058522 A1* | 3/2013 | Raesig | H04L 67/60 709/219 |
| 2013/0150117 A1 | 6/2013 | Rodriguez et al. | |
| 2013/0312042 A1* | 11/2013 | Shaw | H04N 21/4402 725/62 |
| 2013/0332951 A1* | 12/2013 | Gharaat | G11B 27/322 725/19 |
| 2014/0007154 A1 | 1/2014 | Seibold et al. | |
| 2014/0088744 A1 | 3/2014 | Levien et al. | |
| 2014/0168277 A1 | 6/2014 | Ashley et al. | |
| 2015/0112857 A1 | 4/2015 | Gellis et al. | |
| 2016/0180392 A1 | 6/2016 | Liu et al. | |
| 2016/0188286 A1* | 6/2016 | Greene | G11B 27/102 715/716 |

FOREIGN PATENT DOCUMENTS

| | | |
|---|---|---|
| CN | 101500128 A | 8/2009 |
| CN | 101640746 A | 2/2010 |
| EP | 1829382 B1 | 6/2008 |
| EP | 2323046 A1 | 5/2011 |
| JP | 2001084743 A | 3/2001 |

OTHER PUBLICATIONS

Forret, "Experimenting with Movie Hashing/Fingerprinting", blog.forret.com, (http://blog.forret.com/2011/07 experimenting-with-movie-hashingfingerprinting/), Jul. 2, 2011, 2 pages.

Ibrahim, et al., "Unconventional TV Detection Using Mobile Devices", In Proceedings of the 7th International Conference on Mobile Ubiquitous Computing, Systems, Services and Technologies, Porto, PT, Sep. 29-Oct. 3, 2013, 2013, 4 pages.

* cited by examiner

METHODS, SYSTEMS, AND MEDIA FOR DETECTING A PRESENTATION OF MEDIA CONTENT ON A DISPLAY DEVICE

CROSS-REFERENCE TO RELATED APPLICATIONS

This application is a continuation of U.S. patent application Ser. No. 16/895,349, filed Jun. 8, 2020, which is a continuation of U.S. patent application Ser. No. 15/912,084, filed Mar. 5, 2018, which is a continuation of U.S. patent application Ser. No. 15/430,082, filed Feb. 10, 2017, which is a continuation of U.S. patent application Ser. No. 14/930,290, filed Nov. 2, 2015, which is a continuation of U.S. patent application Ser. No. 14/310,655, filed Jun. 20, 2014, each of which is hereby incorporated by reference herein in its entirety.

TECHNICAL FIELD

The disclosed subject matter relates to methods, systems, and media for detecting a presentation of media content on a display device. More particularly, the disclosed subject matter relates to detecting a presentation of media content on a display device and identifying the media content based on detected light levels.

BACKGROUND

While watching media content (e.g., a television program, movie, etc.), a user is often interested in information relating to the media content. For example, the user may want to browse additional information about a topic that is shown in the media content. Additionally, the user may be interested in interacting with an application running on a mobile device (e.g., a mobile phone) to control the playback of the media content, to perform searches through the Internet, and/or to perform other tasks. To experience these interactive features using conventional approaches, a user may have to manually activate an application on a mobile device and/or input program information about the media content being watched by the user. However, manually activating an application and/or inputting information about the media content being watched by the user can be inconvenient.

Accordingly, new mechanisms for detecting a presentation of media content on a display device are desirable.

SUMMARY

In accordance with some implementations of the disclosed subject matter, methods, systems, and media for detecting a presentation of media content on a display device are provided.

In accordance with some implementations of the disclosed subject matter, systems for detecting a presentation of media content on a display device are provided, the systems comprising: a light sensor that detects light levels in the light sensor's surroundings and generates a signal representing the light levels; and at least one hardware processor that is coupled to the light sensor and that is configured to: receive the signal from the light sensor; detect at least one variation in light levels indicative of a presentation of a video scene based on the signal; detect at least one variation in light levels indicative of a scene change subsequent to the video scene based on the signal; and determine that media content is being presented on a display device in response to detecting the variation in light levels indicative of the presentation of the video scene and the variation in light levels indicative of the scene change.

In accordance with some implementations of the disclosed subject matter, methods for detecting a presentation of media content on a display device are provided, the methods comprising: detecting, using a light sensor, light levels in the light sensor's surroundings; generating a signal representing the light levels; detecting, using a hardware processor, at least one variation in light levels indicative of a presentation of a video scene based on the signal; detecting at least one variation in light levels indicative of a scene change subsequent to the video scene based on the signal; and determining that media content is being presented on a display device in response to detecting the variation in light levels indicative of the presentation of the video scene and the variation in light levels indicative of the scene change.

In accordance with some implementations of the disclosed subject matter, non-transitory computer-readable media containing computer-executable instructions that, when executed by a processor, cause the processor to perform a method for detecting a presentation of media content on a display device are provided. In accordance with some implementations, the method comprises: detecting light levels in the light sensor's surroundings; generating a signal representing the light levels; detecting at least one variation in light levels indicative of a presentation of a video scene based on the signal; detecting at least one variation in light levels indicative of a scene change subsequent to the video scene based on the signal; and determining that media content is being presented on a display device in response to detecting the variation in light levels indicative of the presentation of the video scene and the variation in light levels indicative of the scene change.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
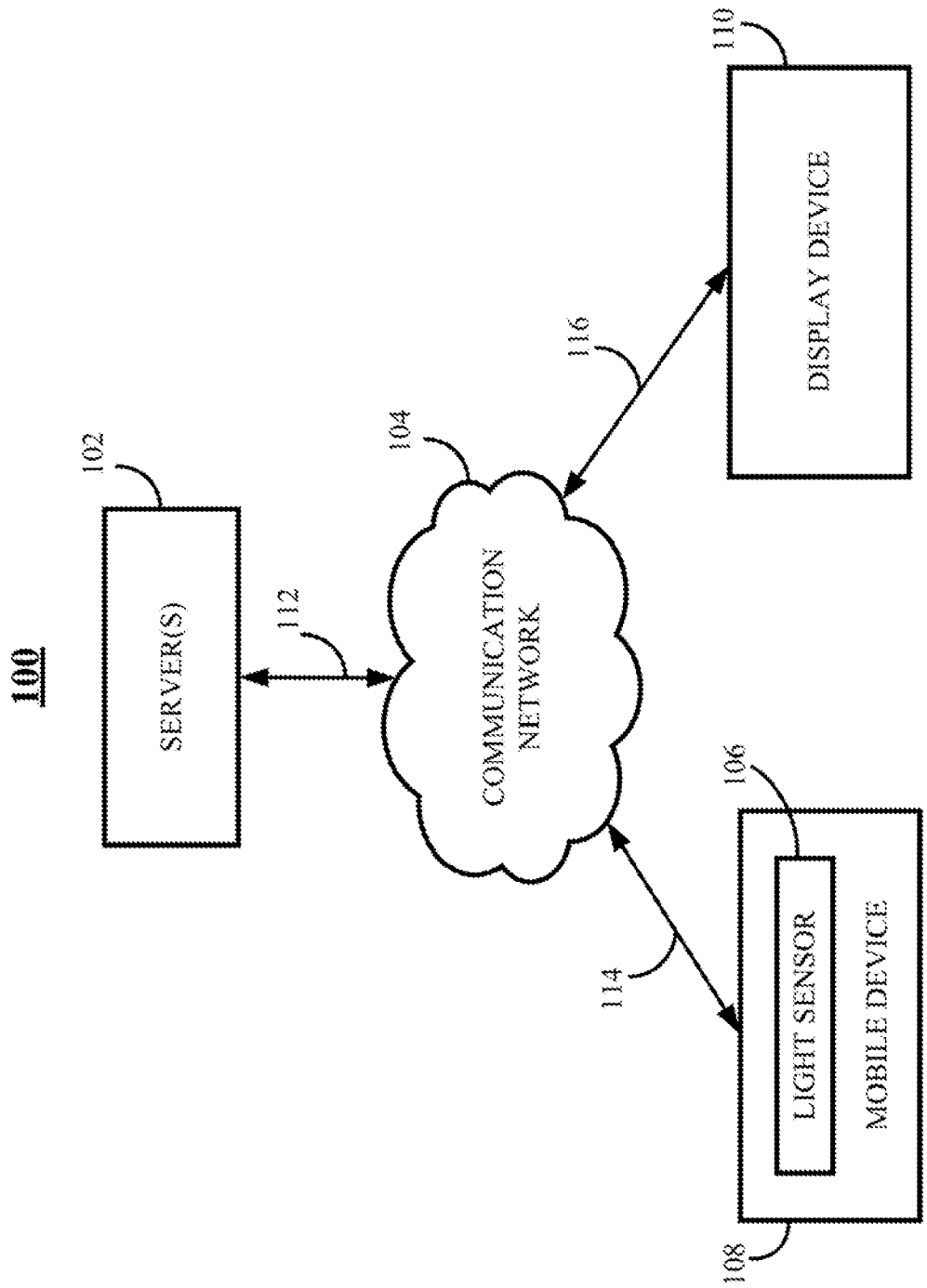
FIG. 1 shows a generalized block diagram of an example of a system for detecting a presentation of media content on a display device in accordance with some implementations of the disclosed subject matter.

In accordance with various implementations, as described in more detail below, mechanisms, which can include systems, methods, and computer-readable media, for detecting a presentation of media content on a display device are provided.

The mechanisms can be implemented with respect to any suitable media content. For example, media content can include any suitable type(s) of content, such as one or more of audio content, video content, text, graphics, multimedia content, captioning content, and/or any other suitable content. As another example, media content may be provided by any suitable source, such as a television provider, a video hosting and/or streaming service, a video recorder, and/or any other suitable content provider. As yet another example, media content may have any suitable format, such as one or more of JPEG, H.264, MPEG-4 AVC, MPEG-7, MP4, and/or any other suitable format. As still another example, a media content item can have any suitable content, such as a movie, television program, streaming media program, recorded video program, and/or any other suitable content.

In some implementations, the mechanisms described herein can detect light levels in the surroundings of a light sensor and can then analyze the detected light levels to detect light level variations indicative of a presentation of media content on a display device (e.g., a television) and/or indicative of the identity of specific media content being presented on the display.

In some implementations, such light level variations can be used to detect a scene and then a scene change in the presentation of a media content item.

In some implementations, a video scene can correspond to any suitable portion of a media content item. For example, a video scene can include a group of video frames that contain similar video content (e.g., a group of video frames in which a difference between two consecutive video frames does not exceed a predetermined threshold). In some implementations, a scene change between two video scenes in a media content item can be identified by detecting a difference between two frames that exceeds a predetermined threshold. In some implementations, the point of a scene change between a first video scene and a second video scene of a media content item can correspond to the last frame of the first video scene, the first frame of the second video scene, a frame inserted between the first video scene and the second video scene, and/or any other suitable portion of the media content item.

In some implementations, a detected pattern of light level variations can be used to identify that a certain media content item is being presented on the display device. In some implementations, the certain media content item can be identified by detecting a pattern of light level variations during a presentation of media content and matching the detected pattern of light level variations against known patterns of light level variations that correspond to known media content items.

These mechanisms can perform a variety of functions. For example, the mechanisms can detect the presence of a television nearby a user (e.g., using a light sensor coupled to a mobile phone associated with the user). The mechanisms can then prompt the user to interact with a mobile device application by executing the application on a mobile device associated with the user. As another example, the mechanisms can identify a media content item being presented on a television device and can present information relating to the identified media content item to a user.

It should be noted that, prior to detecting light levels using a light sensor and/or collecting any other suitable data, the mechanisms can provide a user with an opportunity to provide a consent or authorization to perform actions, such as activating a light sensor, detecting light levels, obtaining signals indicative of light levels, transmitting signals indicative of light signals, processing and/or analyzing signals indicative of light levels, and/or activating an application upon detection of a presentation of media content. For example, upon loading an application on a mobile device (e.g., a mobile phone, a tablet computer, a wearable computer, and/or any other suitable mobile device), the application can prompt the user to provide authorization for activating a light sensor, detecting light levels, obtaining signals indicative of light levels, transmitting signals indicative of light signals, analyzing signals indicative of light levels, and/or performing any other suitable action. In a more particular example, in response to downloading the application and loading the application on a mobile device, the user can be prompted with a message that requests (or requires) that the user provide consent prior to performing these actions. Additionally or alternatively, in response to installing the application, the user can be prompted with a permission message that requests (or requires) that the user provide consent prior to measuring light levels, producing signals indicative of light levels, transmitting signals indicative of light levels, and/or processing and/or analyzing signals indicative of light levels.

Figure 3:
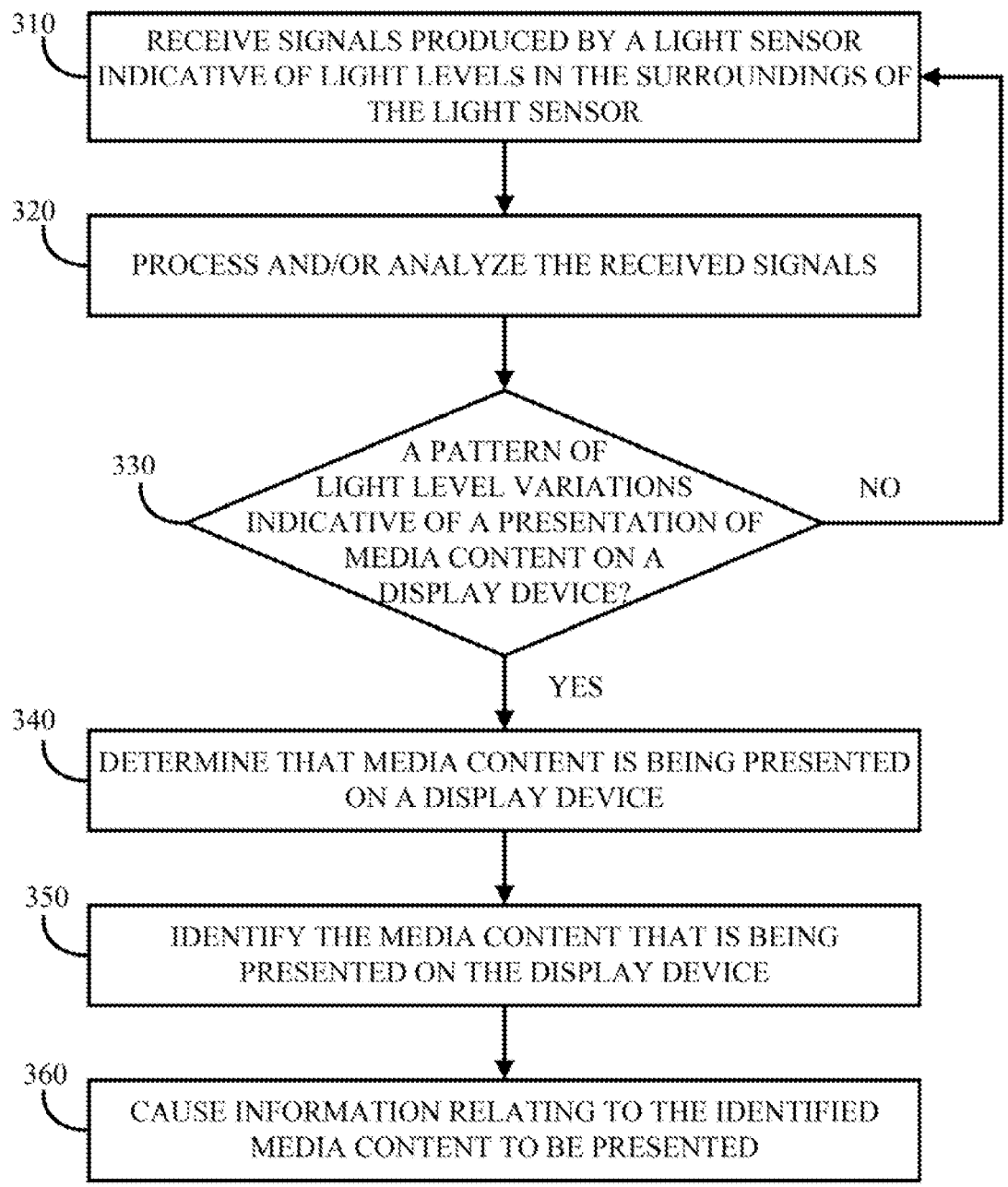
FIG. 3 shows a flow chart of an example of a process for detecting a presentation of media content on a display device in accordance with some implementations of the disclosed subject matter.
Figure 4:
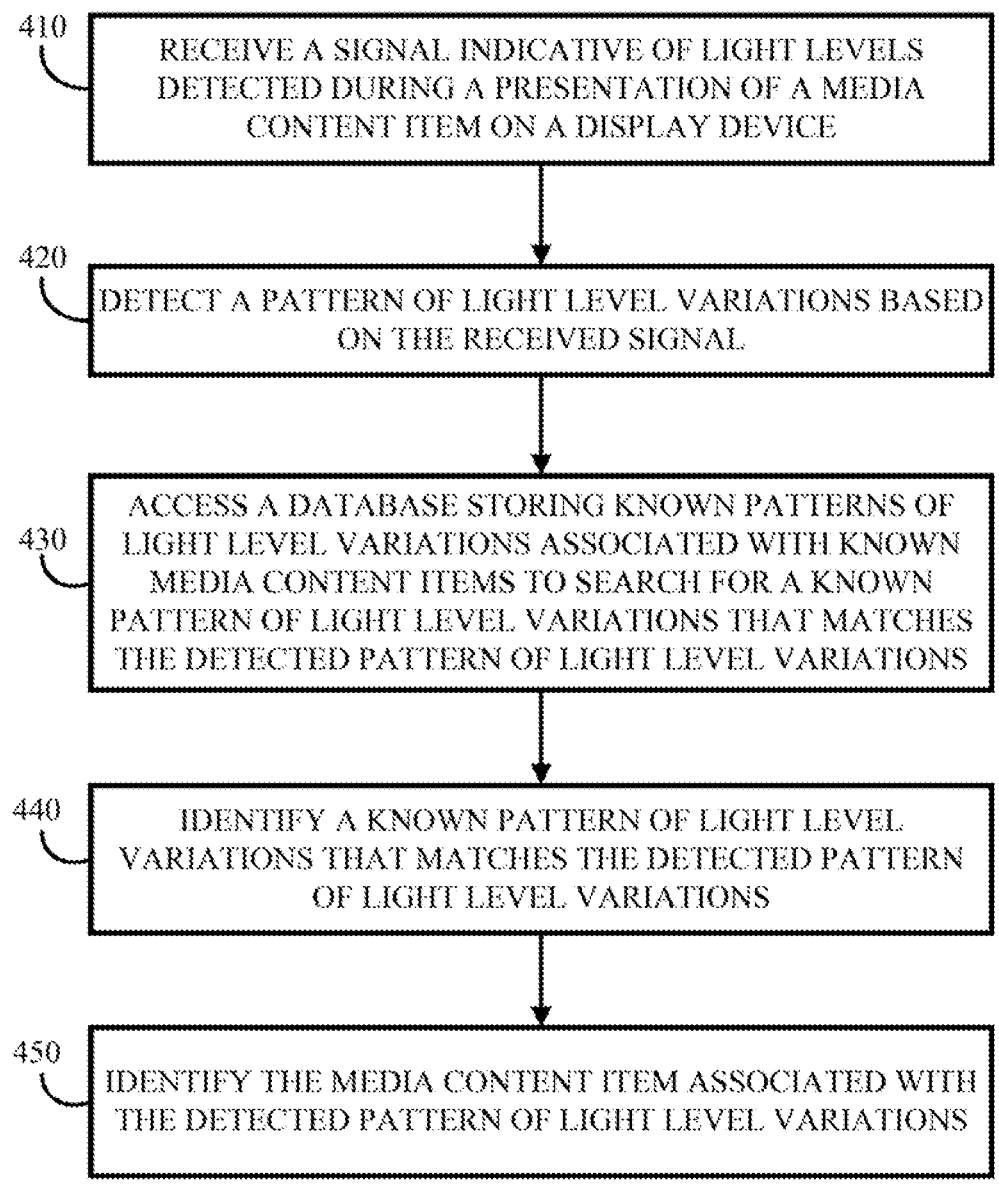
FIG. 4 shows a flow chart of an example of a process for identifying a media content item being presented on a display device in accordance with some implementations of the disclosed subject matter.

Turning to FIG. 1, a generalized block diagram of an example 100 of a system for detecting a presentation of media content on a display device based on detected light levels in accordance with some implementations of the disclosed subject matter is shown. As illustrated, system 100 can include one or more servers 102, a communication network 104, a light sensor 106, one or more mobile device(s) 108, a display device 110, communication links 112, 114, and 116, and/or any other suitable components. In some implementations, one or more suitable portions of processes 300 and 400 as illustrated in FIGS. 3 and 4 can be implemented in one or more components of system 100. For example, one or more suitable portions of processes 300 and 400 can run on one or more of server(s) 102 and mobile device(s) 108 of system 100.

Server(s) 102 can include any suitable device that is capable of receiving and/or analyzing signals produced by a light sensor (e.g., light sensor 106), detecting patterns of light level variations in these signals, detecting the presence of a display device and/or identifying media content being presented on a display device based on patterns of light level variations, performing pattern matching analysis on media content, and/or performing any other suitable functions, such as a hardware processor, a computer, a data processing device, or a combination of such devices.

Light sensor 106 can include any suitable device that is capable of sensing light in the surroundings of light sensor 106, producing signals indicative of light levels in the surroundings of light sensor 106, and/or performing any other suitable function. For example, light sensor 106 can include one or more light sensing elements, such as one or more photodiodes, photodiode arrays, semiconductor charge-coupled device (CCD) image sensors, metal-oxide-semiconductor (CMOS) image sensors, cameras, and/or any other suitable device that can sense light and/or convert the sensed light into signals. Additionally, light sensor 106 can include an analog-to-digital converter (ADC), signal processing circuitry, input and/or output interfaces, and/or any other suitable circuitry for producing a desired output.

Mobile device(s) 108 can include any suitable device that is capable of receiving user inputs, processing and/or analyzing signals produced by light sensor 106, detecting patterns of light level variations in these signals, detecting the presence of a display device and/or identifying media content being presented on a display device based on patterns of light level variations, and/or performing any other suitable function. In some implementations, mobile device(s) 108 can be a mobile phone, a tablet computer, a wearable computer, a laptop computer, a desktop computer, a personal data assistant (PDA), a portable email device, and/or any other suitable device.

Display device 110 can be any suitable device that can receive, convert, and/or present media content, such as a television device, a streaming media player, a media center computer, a CRT display, an LCD, an LED display, a plasma display, a touch-screen display, a simulated touch screen, a tablet computer, a mobile phone, and/or any other suitable device.

In some implementations, each of server(s) 102, light sensor 106, mobile device(s) 108, and display device 110 can be implemented as a stand-alone device or integrated with other components of system 100. For example, light sensor 106 can be coupled to and/or integrated with mobile device(s) 108 (as shown in FIG. 1) in some implementations.

Communication network 104 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

In some implementations, server(s) 102, mobile device(s) 108, and display device 110 can be connected to communication network 104 through communication links 112, 114, and 116, respectively. In some implementations, communication links 112, 114, and 116 can be any suitable communication links, such as network links, dial-up links, wireless links, hard-wired links, any other suitable communication links, or a combination of such links.

Figure 2:
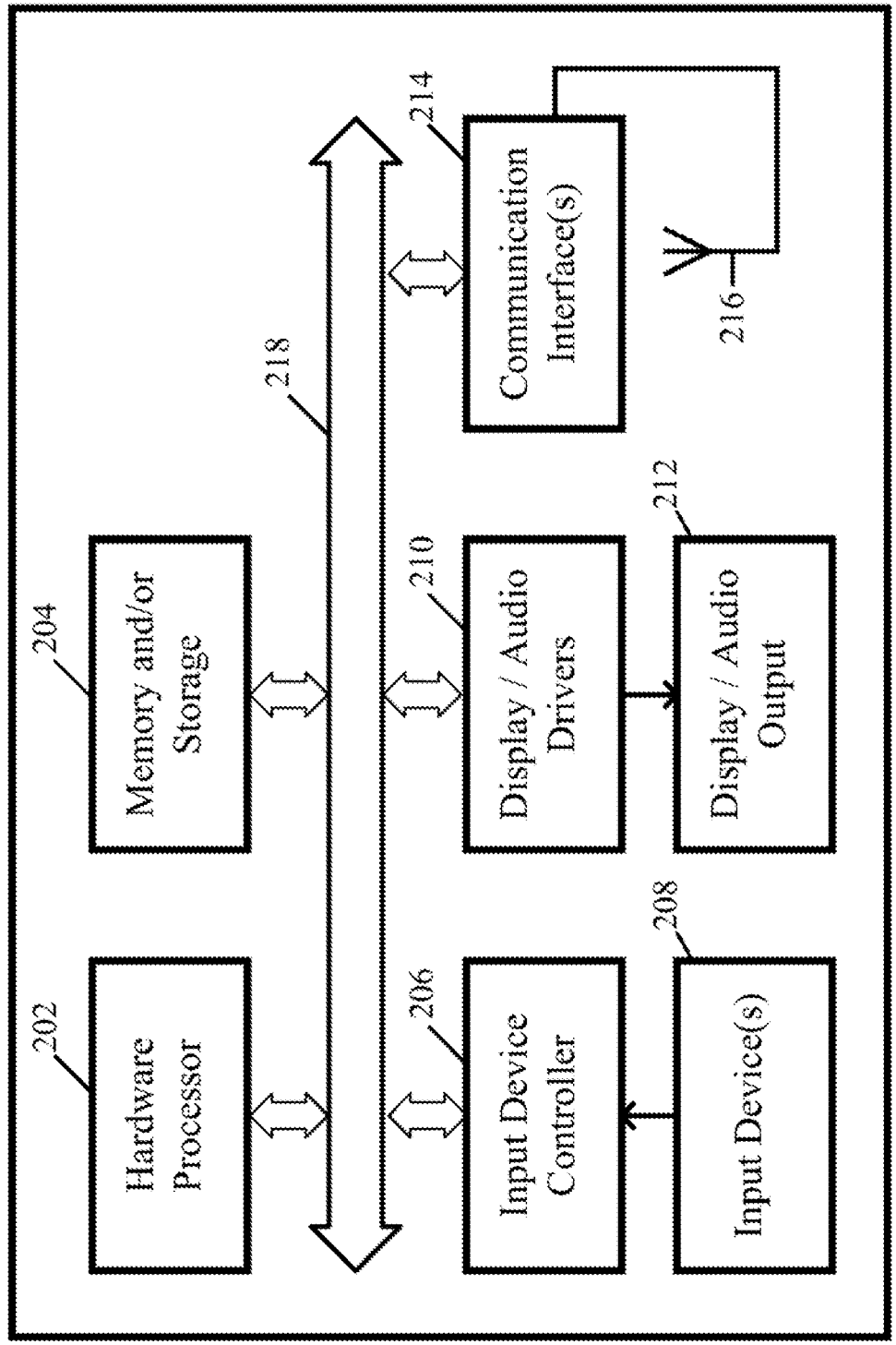
FIG. 2 shows an example of hardware that can be used in a server, a display device, and/or a mobile device in accordance with some implementations of the disclosed subject matter.

Each of server(s) 102, mobile device(s) 108, and display device 110 can include and/or be any of a general purpose device such as a computer or a special purpose device such as a client, a server, and/or any other suitable device. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218, in accordance with some implementations.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some implementations.

Memory and/or storage 204 can be any suitable memory and/or storage for storing programs, data, media content, and/or any other suitable content in some implementations. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 (e.g., such as light sensor 106) in some implementations. For example, input device controller 206 can be circuitry for receiving input from a light sensor, from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and audio output circuitries 212 in some implementations. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 104 in some implementations. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some implementations. In some implementations, antenna 216 can be omitted when not needed.

Bus 218 can be any suitable mechanism for communicating between two or more of components 202, 204, 206, 210, and 214 in some implementations.

Any other suitable components can be included in hardware 200 in accordance with some implementations.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Turning to FIG. 3, a flow chart of an example 300 of a process for detecting a presentation of media content on a display in accordance with some implementations of the disclosed subject matter is shown. In some implementations, one or more portions of process 300 can be implemented by one or more hardware processors, such as a hardware processor of a server 102 and/or a mobile device 108 of FIG. 1.

As illustrated, process 300 can begin by receiving signals produced by a light sensor at 310. In some implementations, the light sensor can be any suitable device that can sense light from the light sensor's surroundings, detect light levels, and/or convert the sensed light into signals. For example, the light sensor can be a light sensor 106 as described above in connection with FIG. 1. In some implementations, the signals can be generated by the light sensor and/or transmitted to a hardware processor executing process 300 continuously, at a suitable interval (e.g., a few milliseconds, every second, a few seconds, a few minutes, and/or any other suitable interval), and/or in any other suitable manner.

In some implementations, the received signals can include any suitable information indicative of light levels in the surroundings of the light sensor. For example, the signals can include any suitable information relating to one or more light levels measured by the light sensor, such as a value of a light level, a time corresponding to a light level, a difference between two light levels, and/or any other suitable information relating to the light level(s). As another example, the received signals can include one or more images, video streams, and/or any other suitable image data.

Next, at 320, process 300 can process and/or analyze the received signals. In some implementations, the received signals can be processed and/or analyzed in any suitable manner to detect a pattern of light level variations indicative of a presentation of media content on a display device. In some implementations, process 300 can process the received signals in any suitable manner to obtain any suitable information relating to variations in light levels. For example, process 300 can process the received signals by calculating one or more parameters representative of a variation in light levels. In some implementations, a parameter representative of a variation in light levels can include a difference between two light levels, a variance of multiple light levels, a deviation of multiple light levels, a difference between a light level and an average of multiple light levels, a variance of multiple differences between levels, and/or any other suitable parameter indicative of variations in light levels. As another example, process 300 can process the received signal to obtain timing information relating to variations in light levels, such as a time corresponding to a particular light level, a time period and/or a time corresponding to a variation in light levels, and/or any other suitable timing information relating to variations in light levels.

In some implementations, the information relating to variations in light levels can be analyzed in any suitable manner. For example, process 300 can analyze the information relating to variations in light levels to detect variations in light levels indicative of a scene change in a presentation of media content. In a more particular example, such a variation in light levels can include a variation in light levels that is greater than a predetermined threshold.

As another example, process 300 can analyze the information relating to variations in light levels to detect variations in light levels indicative of a presentation of a video scene of media content. In some implementations, a variation in light levels indicative of a presentation of a video scene can be a variation in light levels that falls within a predetermined range (e.g., a variation in light levels that is greater than a first threshold but less than a second threshold), a variation in light levels that is less than a predetermined threshold, and/or any other suitable variation in light levels. In some implementations, a variation in light levels indicative of a presentation of a video scene can correspond to light levels that are detected during a suitable time period (e.g., a few seconds, a few minutes, and/or any other suitable time period).

At 330, process 300 can determine whether a pattern of light level variations indicative of a presentation of media content has been detected. This determination can be made in any suitable manner. For example, process 300 can determine that a pattern of light level variations indicative of a presentation of media content has been detected in response to detecting one or more variations in light levels indicative of a presentation of a video scene and then one or more variations in light levels indicative of a scene change.

As another example, process 300 can determine that a pattern of light level variations indicative of a presentation of media content has been detected in response to detecting variations in light levels indicative of a presentation of multiple video scenes and one or more variations in light levels indicative of one or more scene changes during the presentation of the video scenes.

In some implementations, process 300 can return to 310 in response to determining that a pattern of light level variations indicative of a presentation of media content has not been detected (e.g., by failing to detect such a pattern of light level variations for a predetermined time period). Alternatively, upon detecting a pattern of light level variations indicative of a presentation of media content, process 300 can determine that media content is being presented on a display device at 340.

At 350, process 300 can identify information about the media content being presented on the display device. In some implementations, any suitable information relating to the media content can be identified, such as a content identifier (e.g., a program identifier, a uniform resource identifier (URI), and/or any other suitable identifier that can be used to identify the media content item), a title, a description, a channel number, a start time, an end time, a series number, an episode number, and/or any other suitable information that can be used to identify the media content.

In some implementations, the information about the media content can be identified in any suitable manner. For example, the information about the media content can be identified based on a pattern of light level variations detected during the presentation of the media content. In some implementations, the pattern of light level variations can include a pattern of light level variations used to determine that media content is being presented (e.g., such as a pattern of light level variations detected as described in connection with steps 320-330). Alternatively or additionally, the pattern of light level variations can be detected in any other suitable manner (e.g., such as that described below in connection with steps 410 and 420 of FIG. 4).

In some implementations, as described below in connection with FIG. 4, the detected pattern of light level variations can be compared against known patterns of light level variations corresponding to a collection of known media content items. Process 300 can then identify a known media content item corresponding to a matching known pattern of light level variations as being the media content that is being presented on the display device. In some implementations, the pattern of light level variations can be detected by one or more hardware processors executing process 300 and can be transmitted to a suitable device (e.g., a hardware processor executing process 400 of FIG. 4) for analysis. Alternatively or additionally, a hardware processor executing process 300 of FIG. 3 can match the detected pattern of light level variations against known patterns of light level variations to identify the media content being presented on the display device.

As another example, the media content can be identified based on an audio sample representative of the media content being presented on the display device. In a more particular example, an audio fingerprint can be generated from the audio sample and can be compared against known audio fingerprints associated with a collection of known media content items. The media content being presented on the display device can then be identified upon finding a known audio fingerprint that matches the generated audio fingerprint.

As yet another example, the media content can be identified based on one or more frames of the media content being presented on the display device. In a more particular example, process 300 can generate one or more video fingerprints based on the frames using any suitable video fingerprinting technique and can then identify the media content using any suitable video matching technique.

In some implementations, the mechanisms described herein can, for example, include capture modules that can receive and process signals from multiple sources (e.g., television channels, channels on a video hosting Web site, a device that provides recorded video programs, and/or any other suitable sources of media content). For example, in some implementations, these capture modules can monitor multiple sources of media content, detect patterns of light level variations at particular time intervals (e.g., every N milliseconds), capture frames at particular time intervals, generate audio or video fingerprints at particular time intervals, and/or store the detected patterns, captured frames, audio or video fingerprints, and other content identifiers in a storage device.

In some implementations, at 360, process 300 can cause information relating to the identified media content to be presented. In some implementations, any suitable information relating to the media content can be presented, such as information relating to news items, program information, and/or any other suitable content relating to the media content. In some implementations, information relating to the media content can be presented using any suitable media content, such as text, images, video content, audio content, and/or any other suitable content. In some implementations, information relating to the identified media content can be presented using any suitable device. For example, such information can be presented on the display device that is presenting the media content item, a mobile device (e.g., a mobile phone, a tablet computer, a wearable computer, and/or any other suitable mobile device), and/or any other suitable device.

Turning to FIG. 4, a flow chart of an example of a process for identifying a media content item being presented on a display device in accordance with some implementations of the disclosed subject matter is shown. In some implementations, process 400 can be implemented by one or more hardware processors, such as a hardware processor of a server 102 of FIG. 1 and/or a hardware processor of a mobile device 108 of FIG. 1.

As illustrated, process 400 can begin by receiving a signal indicative of light levels detected during a presentation of a media content item on a display device at 410. This signal can be generated and/or received in any suitable manner. For example, the signal can be generated using a light sensor that can detect light levels in the light sensor's surroundings (e.g., step 310 of FIG. 3) and can be transmitted to one or more hardware processors executing process 400. In some implementations, the received signal can correspond to a presentation of any suitable portion or portions of the media content item, such as one or more video scenes, scene changes, a group of pictures, and/or any other suitable portion or portions of the media content item. In some implementations, the received signal can have any suitable duration (e.g., a few seconds, a few minutes, and/or any other suitable duration).

At 420, process 400 can detect a pattern of light level variations based on the received signal. In some implementations, the pattern of light level variations can be detected in any suitable manner. For example, the pattern of light level variations can be detected by calculating one or more parameters representative of a variation in light levels detected during the presentation of the media content item. In some implementations, a parameter representative of a variation in light levels detected during the presentation of the media content item can be a difference between two detected light levels, a difference between a detected light level and an average of multiple detected light levels, an average of multiple differences between detected light levels, a variance of multiple differences between detected light levels, and/or any other suitable parameter indicative of variations in light levels detected during the presentation of the media content item.

As another example, the pattern of light level variations can be detected by associating one or more parameters representative of variations in light levels detected during the presentation of the media content item with suitable timing information. In a more particular example, a given difference between two detected light levels can be associated with a time period during which the light levels were detected, a time at which one of the light levels was detected, and/or any other suitable timing information.

In some implementations, the pattern of light level variations can have any suitable form, such as one or more continuous signals, discrete signals, sequences of numbers, and/or any other suitable form of data that can be used to represent variations in light levels.

In some implementations, the pattern of light level variations can be detected by and/or transmitted from any suitable device, such as one or more hardware processors executing process 300 of FIG. 3. Alternatively or additionally, the pattern of light level variations can be detected by one or more hardware processors executing process 400.

At 430, process 400 can access a database storing known patterns of light level variations associated with known media content items to search for a known pattern of light level variations that matches the detected pattern of light level variations. In some implementations, the database can index and store known patterns of light level variations by media content item.

In some implementations, a known pattern of light level variations associated with a media content item can contain any suitable information relating to variations in light levels corresponding to a presentation of the media content item and/or any suitable portion of the media content item. For example, the known pattern of light level variations can include any suitable information relating to variations in light levels corresponding to a presentation of one or more video scenes of the media content item. In some implementations, information relating to variations in light levels corresponding to a presentation of a video scene can include any suitable parameter or parameters representative of variations in light levels corresponding to the presentation of the video scene, timing information relating to one or more of these parameters (e.g., a time or time period corresponding to a particular parameter representative of variations in light levels corresponding to the presentation of the video scene), timing information relating to the presentation of the video scene (e.g., a start time, an end time, and/or any other suitable information relating to the presentation of the video scene), and/or any other suitable information relating to variations in light levels corresponding to the presentation of the video scene.

As another example, the known pattern of light level variations can include any suitable information relating to variations in light levels corresponding to one or more scene changes during a presentation of the media content item. In some implementations, information relating to variations in light levels corresponding to such a scene change can include a time corresponding to the scene change, one or more parameters representative of variations in light levels corresponding to the scene change, and/or any other suitable information relating to the scene change.

At 440, process 400 can identify a known pattern of light level variations that matches the detected pattern of light level variations. In some implementations, a matching known pattern of light level variations can be identified in any suitable manner. For example, a matching known pattern of light level variations can be identified by determining similarities and/or differences between the detected pattern of light level variations and each of the known patterns of light level variations using a cross-correlation function, a coherence function, a mutual information function, and/or any other suitable measure of similarity and/or difference between a detected pattern of light level variations and a known pattern of light level variations.

As another example, a matching known pattern of light level variations can be identified by comparing information relating to variations in light levels associated with the detected pattern of light level variations and information relating to variations in light levels associated with each of the known patterns of light level variations. In a more particular example, information relating to a variation in detected light levels (e.g., one or more parameters representative of the variations in detected light levels, a time corresponding to the variation in detected light levels, and/or any other suitable information relating to the variation in detected light levels) can be compared to information relating to scene changes during a presentation of a media content item associated with a known pattern of light level variations (e.g., one or more parameters representative of variations in light levels corresponding to a scene change, a time corresponding to a scene change, and/or any other suitable information relating to the scene changes) to identify a match. In another more particular example, information relating to variations in detected light levels during a given time period can be compared to information relating to variations in light levels corresponding to a presentation of one or more video scenes of a media content item associated with a known pattern of light level variations to identify a match.

At 450, process 400 can identify the media content item associated with the detected pattern of light level variations. For example, upon identifying a known pattern of light level variations that matches the detected pattern of light level variations, process 400 can identify a media content item associated with the known pattern of light level variations as being the media content item associated with the detected pattern of light level variations. Additionally, in some implementations, process 400 can retrieve any suitable information relating to the media content item, such as a content identifier (e.g., a program identifier, a uniform resource identifier (URI), and/or any other suitable identifier that can be used to identify the media content item), a title, a description, a channel number, a start time, an end time, a series number, an episode number, and/or any other suitable information that can be used to identify the media content item.

It should be noted that the above steps of the flow diagrams of FIGS. 3-4 can be executed or performed in any order or sequence not limited to the order and sequence shown and described in the figures. Also, some of the above steps of the flow diagrams of FIGS. 3-4 can be executed or performed substantially simultaneously where appropriate or in parallel to reduce latency and processing times. Furthermore, it should be noted that FIGS. 3-4 are provided as examples only. At least some of the steps shown in these figures may be performed in a different order than represented, performed concurrently, or altogether omitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for detecting a presentation of media content on a display device based on detected light levels are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A system for detecting a presentation of media content, the system comprising:
    a hardware processor that:
        receives a light level signal relating to an environment of a display device;
        determines that the light level signal is indicative of a video scene being presented on the display device based on a combination of the light level signal and timing information;
        in response to determining that the light level signal is indicative of the video scene being presented on the display device, identifies media content corresponding to the video scene being presented on the display device;
        retrieves a content identifier for the media content; and
        causes the content identifier to be presented on the display device.

2. The system of claim 1, wherein the light level signal includes light variation information in the environment of the display device.

3. The system of claim 1, further comprising a sensor that is connected to the hardware processor and that detects light levels in the environment of the sensor.

4. The system of claim 3, wherein the sensor is further configured to generate the light level signal representing the detected light levels.

5. The system of claim 1, wherein the hardware processor further:
receives an updated light level signal; and
determines whether the updated light level signal is indicative of a scene change subsequent to the video scene in the media content.

6. The system of claim 1, wherein the hardware processor further determines a pattern of light level variations from the light level signal.

7. The system of claim 6, wherein the hardware processor further compares the pattern of light level variations to a plurality of known patterns of light level variations associated with a plurality of known media content items, wherein the content identifier is identified based on the comparison.

8. The system of claim 7, wherein the comparison of the pattern of light level variations to the plurality of known patterns of light level variations associated with the plurality of known media content items includes determining a cross-correlation between the pattern of light level variations and each of the plurality of known patterns of light level variations.

9. The system of claim 1, wherein the hardware processor further derives a parameter representative of a light variation.

10. A method for detecting a presentation of media content, the method comprising:
receiving, using a hardware processor, a light level signal relating to an environment of a display device;
determining that the light level signal is indicative of a video scene being presented on the display device based on the light level signal and related timing information;
in response to determining that the light level signal is indicative of the video scene being presented on the display device, identifying, using the hardware processor, a media content corresponding to the video scene being presented on the display device;
retrieving, using the hardware processor, a content identifier for the media content; and
causing, using the hardware processor, the content identifier to be presented on the display device.

11. The method of claim 10, wherein the light level signal includes light variation information in the environment of the display device.

12. The method of claim 10, wherein the hardware processor is connected to a sensor that detects light levels in the environment of the sensor.

13. The method of claim 12, further comprising generating the light level signal representing the detected light levels.

14. The method of claim 10, further comprising:
receiving an updated light level signal; and
determining whether the updated light level signal is indicative of a scene change subsequent to the video scene in the media content.

15. The method of claim 10, further comprising determining a pattern of light level variations from the light level signal.

16. The method of claim 15, further comprising comparing the pattern of light level variations to a plurality of known patterns of light level variations associated with a plurality of known media content items, wherein the content identifier is identified based on the comparison.

17. The method of claim 16, wherein the comparison of the pattern of light level variations to the plurality of known patterns of light level variations associated with the plurality of known media content items includes determining a cross-correlation between the pattern of light level variations and each of the plurality of known patterns of light level variations.

18. The method of claim 10, further comprising deriving a parameter representative of a light variation.

19. A non-transitory computer-readable medium containing computer-executable instructions that, when executed by a hardware processor, cause the hardware processor to perform a method for detecting a presentation of media content on a display device, the method comprising:
receiving a light level signal relating to an environment of a display device;
determining that the light level signal is indicative of a video scene being presented on the display device based on the light level signal and timing information;
in response to determining that the light level signal is indicative of the video scene being presented on the display device, identifying a media content corresponding to the video scene being presented on the display device;
retrieving a content identifier for the media content; and
causing the content identifier to be presented on the display device.

20. The non-transitory computer-readable medium of claim 19, wherein the light level signal includes light variation information in the environment of the display device.

* * * * *